US012792768B2

(12) United States Patent
Maharaj et al.

(10) Patent No.: US 12,792,768 B2
(45) Date of Patent: Nov. 10, 2026

(54) ONLINE TESTING DATA GOVERNANCE

(71) Applicant: Adobe Inc., San Jose, CA (US)

(72) Inventors: Akash Vivek Maharaj, Palo Alto, CA (US); Tao Wang, Saratoga, CA (US); Ritwik Sinha, Cupertino, CA (US); Harleen Sahni, Washington, DC (US); David Thomas Arbour, Charlottesville, VA (US)

(73) Assignee: Adobe Inc., San Jose, CA (US)

( * ) Notice: Subject to any disclaimer, the term of this patent is extended or adjusted under 35 U.S.C. 154(b) by 167 days.

(21) Appl. No.: 18/320,084

(22) Filed: May 18, 2023

(65) Prior Publication Data

US 2024/0386133 A1 Nov. 21, 2024

(51) Int. Cl.
*G06F 21/62* (2013.01)

(52) U.S. Cl.
CPC .. *G06F 21/6245* (2013.01); *G06F 2221/2141* (2013.01)

(58) Field of Classification Search
CPC ..................... G06F 21/6245; G06F 2221/2141
See application file for complete search history.

(56) References Cited

U.S. PATENT DOCUMENTS 8,880,697 B1 * 11/2014 Liu .................... G06Q 30/0255 709/201
2010/0332550 A1 * 12/2010 Ainslie ................. G06F 21/316 709/224
2012/0331567 A1 * 12/2012 Shelton ................ G06Q 50/265 726/28
2014/0115712 A1 * 4/2014 Powell ................ G06F 21/6263 726/26
2015/0154415 A1 * 6/2015 Wu ..................... G06F 11/2221 713/165
2018/0011973 A1 * 1/2018 Fish ..................... A61B 5/0022
2019/0236306 A1 * 8/2019 Ding .................... G06F 11/3006
2021/0133648 A1 * 5/2021 Bennett ............... G06F 21/6245
2021/0141924 A1 * 5/2021 Gorman ............... G06Q 30/018
2022/0283793 A1 * 9/2022 Demarne .............. G06F 11/302
2022/0375596 A1 * 11/2022 Ferro, Jr. ............... G16H 80/00
2024/0291863 A1 * 8/2024 Cohen ...................... G06F 21/53
2024/0386133 A1 * 11/2024 Maharaj .............. G06F 21/6245

OTHER PUBLICATIONS

Adobe , "Data Governance overview", Adobe [retrieved Apr. 4, 2023]. Retrieved from the Internet <https://experienceleague.adobe.com/docs/experience-platform/data-governance/home.html?lang=en>., 8 Pages.

(Continued)

*Primary Examiner* — Catherine Thiaw
*Assistant Examiner* — Nega Woldemariam
(74) *Attorney, Agent, or Firm* — FIG. 1 Patents

(57) ABSTRACT

Online testing data governance techniques and systems are described. These techniques support incorporation of data governance as part of online testing through use of a testing governance system implemented as part of a testing system. These techniques are configured to address technical challenges specific to online testing involving design of the online test, runtime during which the online test is executed, and reporting of test results.

20 Claims, 8 Drawing Sheets

(56) References Cited

OTHER PUBLICATIONS

Arbour, David , et al., "Online Balanced Experimental Design", Cornell University arXiv, arXiv.org [retrieved Apr. 4, 2023]. Retrieved from the Internet <https://arxiv.org/pdf/2203.02025.pdf>., Mar. 3, 2022, 21 Pages.
Athey, Susan , et al., "Recursive partitioning for heterogeneous causal effects", Proc Natl Acad Sci USA, vol. 113, No. 27 [retrieved Apr. 4, 2023]. Retrieved from the Internet <http://bayes.acs.unt.edu:8083/BayesContent/class/rich/articles/Recursive_Partitioning_For_Heterogeneous_Causal_Effects.pdf>., Jul. 5, 2016, 8 Pages.
Waudby-Smith, Ian , et al., "Time-uniform central limit theory and asymptotic confidence sequences", Cornell University arXiv, arXiv.org [retrieved Apr. 4, 2023]. Retrieved from the Internet <https://arxiv.org/pdf/2103.06476.pdf>., Mar. 31, 2023, 63 Pages.

* cited by examiner

ONLINE TESTING DATA GOVERNANCE

BACKGROUND

A variety of entities employ regulations, guidelines, and data protection laws specifying how to handle sensitive user information. Examples of these entities include government entities (e.g., federal, state, and city level), service provider systems (e.g., digital service providers), regulatory agencies, broadcast systems, streaming platforms, corporations, and so on. An inability to do so results in exposure to fines, decreased consumer goodwill, targeting by malicious parties, and so forth.

However, conventional techniques used to comply with these different regulations, guidelines, and data protection laws are fractured across the variety of different entities and are challenged by continual changes to the regulations and guidelines themselves. These challenges hinder service provider system operation that is tasked with supporting and/or are exposed to sensitive user information as part of maintaining compliance.

SUMMARY

Online testing data governance techniques and systems are described. These techniques support incorporation of data governance as part of online testing through use of a testing governance system implemented as part of a testing system. These techniques are configured to address technical challenges specific to online testing involving design of the online test, runtime during which the online test is executed, and reporting of test results.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
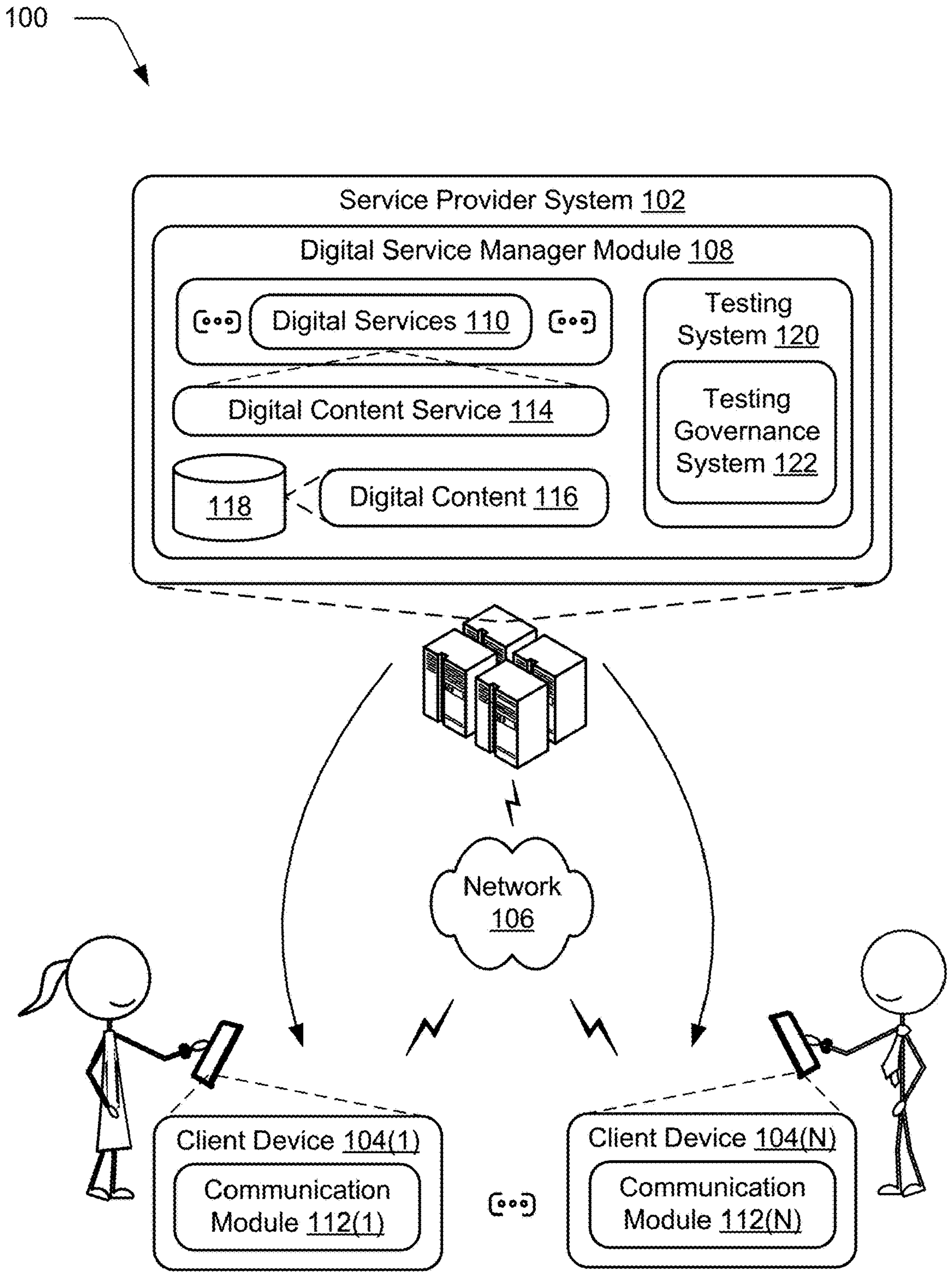
FIG. 1 is an illustration of a digital medium environment in an example implementation that is operable to employ online testing data governance techniques described herein.

Service provider systems often handle potentially sensitive user information. To do so, the service provider systems are tasked with complying with regulations, guidelines, and data protection laws specifying how to handle this potentially sensitive user information. Complicating this task is the ever-changing nature of sensitive user information (e.g., changes to "what" is being shared), differences in how the sensitive user information is to be handled, what types of data are considered sensitive, and so forth. Conventional techniques to do so are inefficient, fractured, and expose service provider systems to potential liabilities, data breaches, and so forth.

To address these technical challenges, online testing data governance techniques and systems are described. These techniques support incorporation of data governance as part of online testing, which is not possible in conventional techniques. Further, these techniques are configured to address technical challenges specific to online testing involving design of the online test, runtime during which the online test is executed, and reporting of test results which again is not possible in conventional techniques.

In one or more examples, a testing governance system is utilized in conjunction with a testing system to control online testing of digital content involving segments of a user population, which are also referred to as "user segments." The testing governance module begins in these examples by generating governance data. The testing governance module, for instance, outputs a user interface via which user inputs are received that specify attributes. The attributes may be indicated via the user inputs as involving potentially sensitive subject matter (e.g., to be addressed) or indicated as not involving potentially sensitive subject matter, i.e., are "safe."

The testing governance module also supports input of policies via the user interface to specify what actions are to be undertaken upon encountering the attribute. The policy, for instance, may specify the attribute is to be restricted entirely from use, support contextual considerations (e.g., use of attribute "Y" is permitted if used for medical task "Z"), and so forth. Machine-learning techniques may also be employed, such as to leverage natural language understanding and/or generative artificial intelligence (AI) techniques to further define an input attribute, e.g., to identify similar attributes to be controlled based on an input attribute.

The governance data is then usable by the testing governance system to control online testing through various stages, include design of an online test, runtime of the online test, and reporting of results of the online test. In an initial example, a design governance module of the testing governance system leverages the governance data to control online testing at a design stage of the online test. To do so, the design governance module employs the attributes and policies specified by the governance data to control which attributes are included as part of designing an online test as well as use of attributes as part of the test.

The online test, for instance, may involve an A/B test that involves transmission of digital content to user segments defined using one or more attributes. The design governance module may therefore control use of the attributes as part of the design on the online test. The design governance module, for instance, may restrict use of specific attributes, confirm intended usage of questionable attributes, permit specifically identified attributes, and so forth when creating an online test. The design governance module may also include functionality to govern use of those attributes and related attributes as part of the digital content that is a subject of the online test. As a result, the design governance module provides protection before the digital content and user segments are actually utilized as part of an online test.

In an additional example, a runtime governance module of the testing governance system is used to control online testing at runtime as performed by a testing system. The control is performable in a variety of ways. The runtime governance module, for instance, is configurable to leverage the governance data during operation of the online test at runtime. Examples of this control include user selection of user identifiers (IDs) based on attributes, selection of digital content, and control of digital content transmission to respective client devices associated with the user IDs. The runtime governance module is configured to support this control independent of the design governance module, and thus provide protection in implementations in which online tests are received that are not vetted by the design governance module.

In a further example, a reporting governance module is utilized by the testing governance system to control analysis and reporting performed on test result data that describes operation of the online test. The reporting governance module is configured to control "how" and "what" is reported as part of analysis of the test result data, e.g., generated during runtime. Like the runtime governance module, the reporting governance module is configured to support this control independent of the design governance module and the runtime governance module, and thus provide protection in implementations in which test results are received that are not vetted by either of the other modules.

The reporting governance module, for example, is configured to control use of sensitive attributes as part of automated heterogenous treatment effect detection. While a headline report of a test may involve examining an overall difference in performance of a key metric between treatment and control groups (e.g., an average treatment effect), additional analysis is also performed for heterogenous treatment effects. In one such example, "Is a treatment effect for use of a first type of client device different than for use of a second type of client device." Thus, in this example the reporting governance module is configured to implement heterogenous treatment effect detection that controls use of attributes from underlying data, e.g., to restrict, to permit in certain situations based on context, and so forth.

As a result, the online testing data governance techniques and systems overcome technical challenges involved in online testing, which is not possible in conventional techniques. Additionally, these techniques are configured to address technical challenges specific to online testing involving design of the online test, runtime, and reporting which again is not possible in conventional techniques. Further discussion of these and other examples is included in the following section and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Online Testing Environment

FIG. 1 is an illustration of a digital medium environment 100 in an example implementation that is operable to employ online testing data governance techniques described herein. The illustrated environment 100 includes a service provider system 102 and a plurality of client devices, examples of which are illustrated as client device 104(1), . . . , client device 104(N). Computing devices that implement the service provider system 102 and the client devices 104(1)-104(N) are configurable in a variety of ways.

A computing device, for instance, is configurable as a desktop computer, a laptop computer, a mobile device (e.g., assuming a handheld configuration such as a tablet or mobile phone as illustrated), and so forth. Thus, a computing device ranges from full resource devices with substantial memory and processor resources (e.g., personal computers, game consoles) to a low-resource device with limited memory and/or processing resources (e.g., mobile devices). Additionally, although a single computing device is shown and described in instances in the following discussion, a computing device is also representative of a plurality of different devices, such as multiple servers utilized by a business to perform operations "over the cloud" as described in FIG. 8.

The service provider system 102 includes a digital service manager module 108 that represents functionality usable to implement and manage operation of digital services 110. Digital services 110 are accessible remotely over the network 106 in the illustrated example by the client devices 104(1)-104(N) using respective communication modules 112(1), . . . , 112(N), e.g., a network-enabled application, plug-in module, browser, and so forth. The service provider system 102, as implementing a network platform, implements the digital services 110 through execution of software by respective servers or other hardware devices.

Digital services 110 are configurable to support a wide variety of functionalities. Digital services 110, for instance, support a digital content service 114 that is used to manage and control output of digital content 116 from a storage device 118. Examples of digital content 116 include digital images, webpages, digital music, digital videos, social media posts, digital marketing materials, and so forth.

The digital service manager module 108 is configurable, through use of the digital content service 114, to control which items of digital content 116 are provided to respective client devices 104(1)-104(N). The digital content service 114, for instance, implements a recommendation engine to surface items of digital content 116 as part of a search that are potentially of interest to respective users of the devices, such as digital music of interest, a digital move to watch, search results based on a search query, and so forth.

As part of controlling digital content output, the digital service manager module 108 supports online testing to test which items of digital content 116 are of interest to respective users. Functionality to do so by the digital service manager module 108 is illustrated as a testing system 120. The testing system 120 is configured to implement a variety of different testing techniques. In one or more examples, the testing system 120 is configured to address segments of a user population, also referred to as user segments. Membership in a user segment is defined using a variety of attributes that specify demographic, behaviors, interests, and so on. The testing system 120 then controls which items of digital content 116 are provided to respective user segments and a result is tested on achievement of an action, e.g., purchase of an item represented in the digital content 116, consumption of the digital content itself, and so forth.

A variety of types of attributes are usable to define membership of client devices 104(1)-104(N) and respective entities in particular segments. In a demographic segmentation example, demographic attributes are used, such as age, gender, income, education, occupation, and family size. In a geographic segmentation example, attributes are based on location such as country, region, city, state, neighborhood, continent, and so forth. In a psychographic segmentation example, personality attributes include a personality traits, values, attitudes, interests, and lifestyle preferences. For behavioral segmentation, example attributes as based on actions and user behaviors, such as product usage, brand loyalty, purchasing habits, online activity, subscription utilization, and so forth.

For a needs-based segmentation example, this technique includes attributes that are based on specific needs, problems, and/or desires that are addressed by a particular item of digital content 116 or an item represented by the digital content 116, e.g., a physical item. In technographic segmentation, attributes are based on technology usage, such as particular device, platforms, and/or software utilized as part of the client devices 104(1)-104(N). In a customer-journey segment example, a user's journey through various stages towards archiving an action are indicated using corresponding attributes, e.g., as part of a buying process. A variety of other attribute examples are also contemplated.

Consequently, a variety of different types of attributes are usable as part of online testing as implemented by the testing system 120. However, in some instances those attributes involve potentially sensitive information. The attributes, for instance, may specify characteristics that are improper in any scenario. In another instance, use of an attribute may be proper in one scenario and yet improper in another scenario, e.g., medical information. Conventional data governance techniques used to control access and use of the attributes, however, are fractured across different systems as specified by different entities. Further, conventional online testing techniques do not support any such control.

Accordingly, the testing system 120 employs a testing governance system 122 that is representative of functionality to incorporate data governance as part of online testing implemented by the testing system 120. The testing governance system 122 is configured to control overall management of data (e.g., digital content 116) within the service provider system 102. Control of the data includes online test design, implementation of online tests at runtime, and analysis of data describing a result of the test. In this way, the testing governance system 122 supports standards for managing potentially sensitive data, ensuring data quality, security, privacy, and enabling compliance with regulatory requirements. The testing governance system 122, therefore, implements functionality to maintain data integrity, ensure that the data is used ethically and responsibly, and protect the data from misuse or unauthorized access.

Data governance involves a range of activities involved as part of online testing by the testing system 120. Examples of data governance as implemented by the data governance system 122 include data classification and categorization, data quality management, data security and privacy, data retention and archiving, and data compliance and regulation. The testing governance system 122 supports collaboration between entities (e.g., between different departments within the entity) as well as with third-party entities, e.g., regulatory agencies, to ensure that data is managed in a consistent and coordinated manner. Further discussion of these and other examples is included in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Online Testing Data Governance

The following discussion describes online testing data governance techniques that are implementable utilizing the described systems and devices. Aspects of the procedure are implemented in hardware, firmware, software, or a combination thereof. The procedure is shown as a set of blocks that specify operations performable by hardware and are not necessarily limited to the orders shown for performing the operations by the respective blocks.

Blocks of the procedure, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform an algorithm. In portions of the following discussion, reference will be made to FIGS. 1-7.

Figure 2:
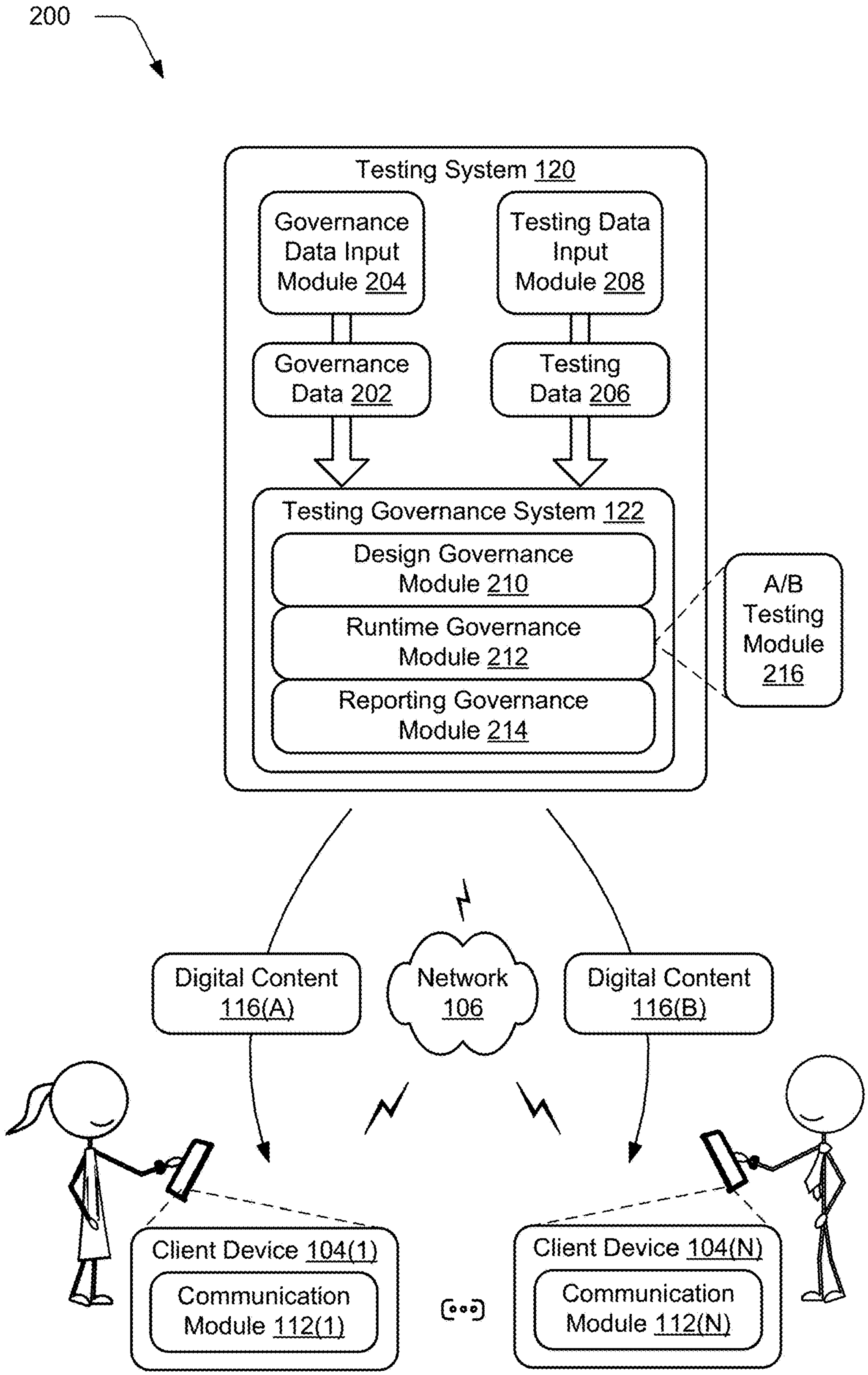
FIG. 2 depicts a system in an example implementation showing operation of the testing system of FIG. 1 in greater detail.
Figure 7:
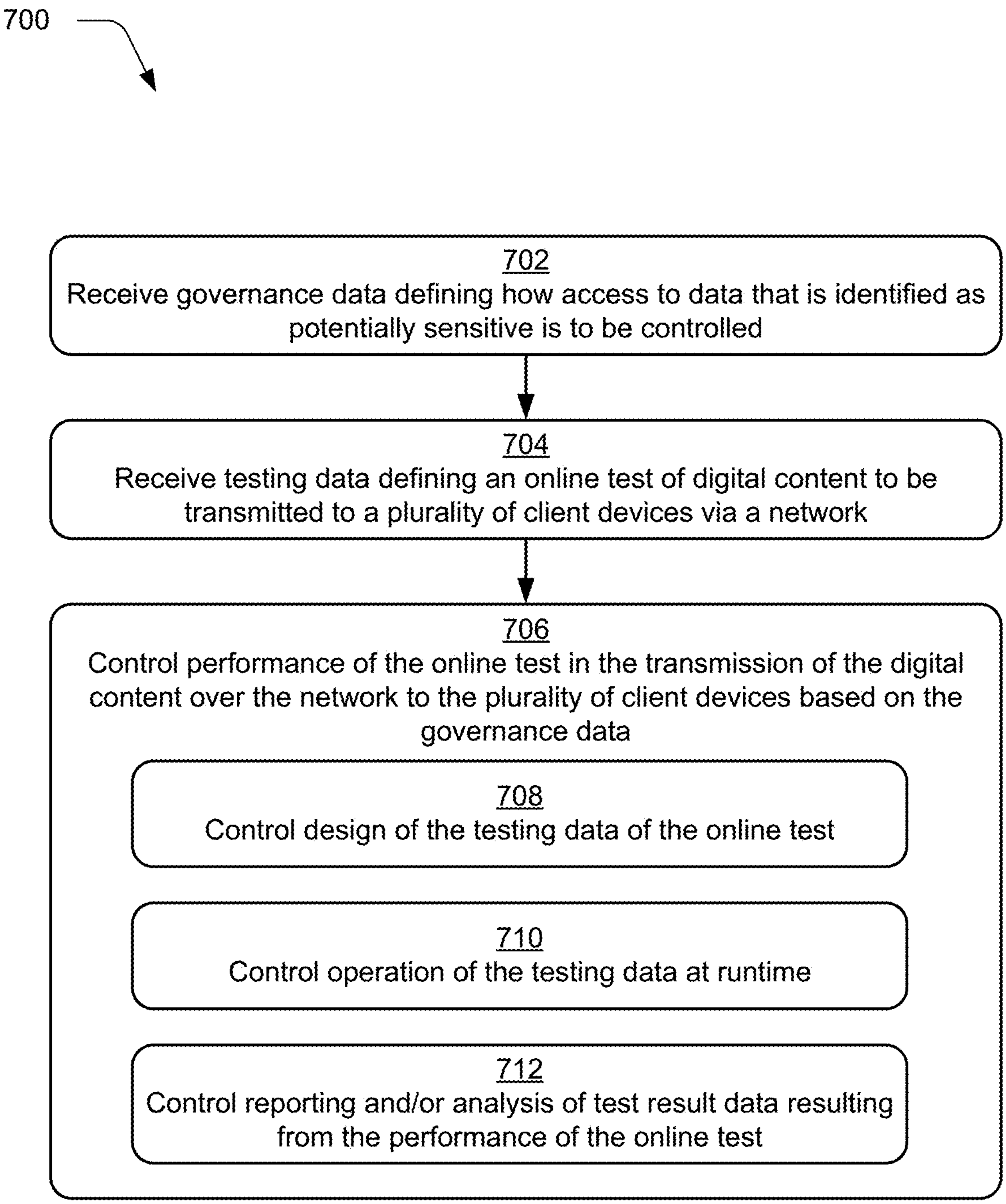
FIG. 7 is a flow diagram depicting an algorithm as a step-by-step procedure in an example implementation of operations performable for accomplishing a result of online testing data governance.

FIG. 2 depicts a system 200 in an example implementation showing operation of the testing system 120 of FIG. 1 in greater detail. FIG. 7 is a flow diagram depicting an algorithm 700 as a step-by-step procedure in an example implementation of operations performable for accomplishing a result of online testing data governance.

To begin in the illustrated example, the testing governance system 122 receives governance data 202 defining how access to data that is identified as potentially sensitive is to be controlled (block 702). The governance data 202, for instance, is received from a governance data input module 204 that identifies attributes and policies to be used to controlling use of the attributes. An example of generation of the governance data 202 by the governance data input module 204 is further described in relation to FIG. 3.

Testing data 206 is also received defining an online test of digital content to be transmitted to a plurality of client devices 104(1)-104(N) via a network 106 (block 704). The testing data 206, for instance, is received from a testing data input module 208, an example of which is a testing design module 402 of FIG. 4. The testing data 206 describes particular attributes used to define user segments as well as which items of digital content are to be provided to the user segments, respectively.

The testing governance system 122 then controls transmission of the digital content 116 over the network 106 to the plurality of client devices 104(1)-104(N) as specified by the testing data 206 of the online test based on the governance data 202 (block 706). In a first example, design of the testing data of the online test is controlled (block 708) by a design governance module 210 as further described in relation to FIG. 4. In a second example, operation of the testing data at runtime is controlled (block 710) by a runtime governance module 212 as further described in relation to FIG. 5. In a third example, reporting and/or analysis of test result data resulting from the performance of the online test is controlled (block 712) by a reporting governance module 214 as further described in relation to FIG. 6.

The online test as implemented by the testing system 120 is configurable in a variety of ways. In one such example, the testing system 120 is configured to implemented A/B testing through use of an A/B testing module 216. In A/B testing, user segments are generated based on attributes as described above. Goals are also defined, e.g., to purchase a represented good or service, a "click through," page views, and so forth.

Different variations of the digital content 116 are then developed for the user segment, e.g., for different configurations of webpages, recommend different items of content, and so forth. The testing system 120 then transmits the variations, an example of which is digital content 116(A) transmitted to client device 104(1) and digital content 116 (B) as transmitted to client device 104(N). Testing result data is then obtained, such as to describe whether a defined goal has been achieved, which is then analyzed. Accordingly, the testing governance system 122 in this example is configured to address the different states of design, runtime, and governance which is not possible in conventional techniques, further examples of which are described in the following discussion and shown in corresponding figures.

Figure 3:
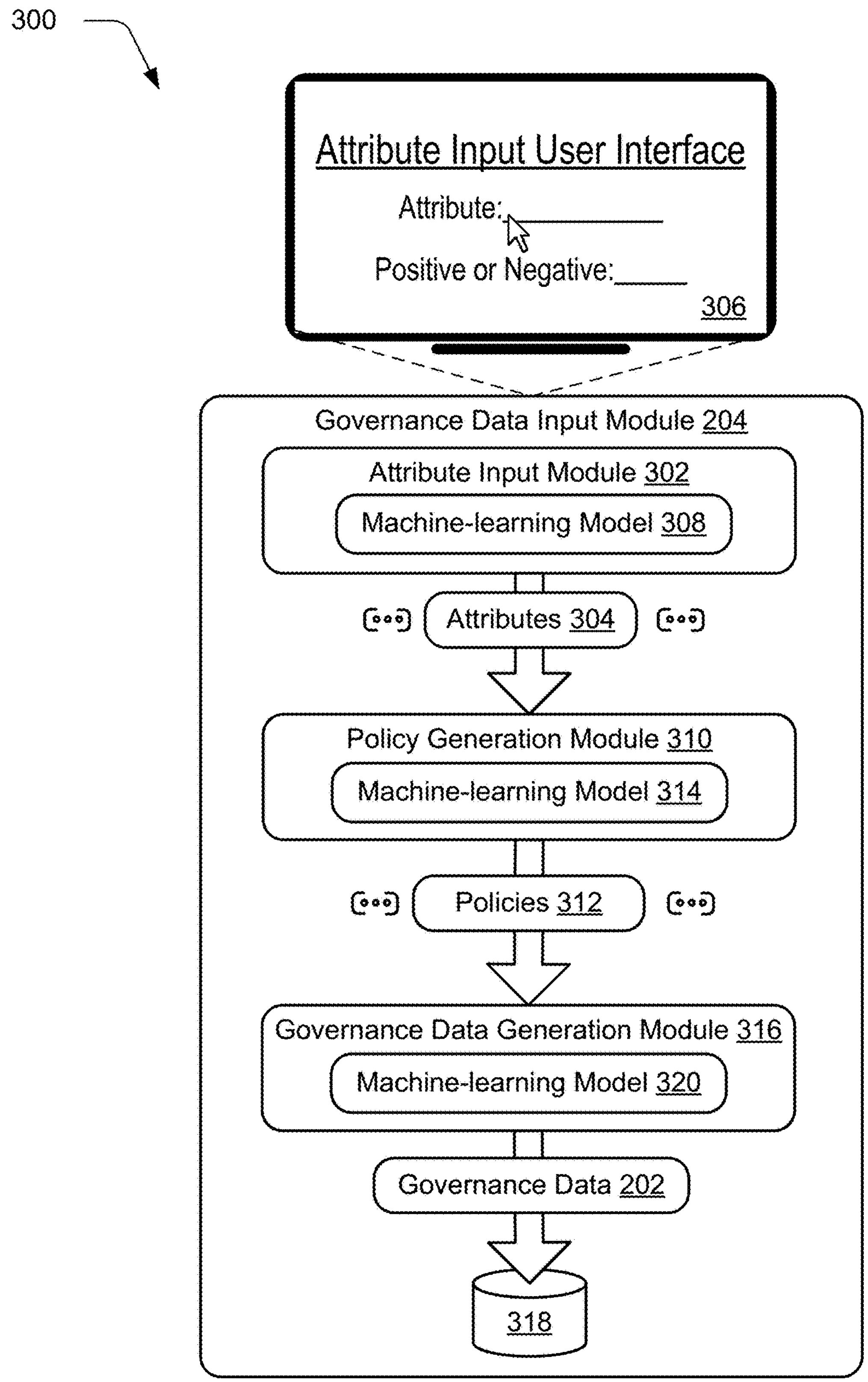
FIG. 3 depicts a system in an example implementation showing operation of a governance data input module of FIG. 2 in greater detail.

FIG. 3 depicts a system 300 in an example implementation showing operation of a governance data input module 204 of FIG. 2 in greater detail. In this example, an attribute input module 302 is configured to input attributes 304, the use of which is to be controlled by the testing governance system 122. A testing user interface 306, for instance, is output that supports options to specify an attribute and whether use of the attribute is considered "positive" or "negative" as involving potentially sensitive user information.

The potentially sensitive information, for instance, refers to data that is usable to identify, contact, and/or locate an entity (e.g., human being, corporate entity such as a business), data that may have an impact on an entity's privacy, safety, financial security, and so forth. Examples of potentially sensitive information include personal identification information (PII) such as a full name, social security number, business identifier, passport number, personal ID number, tax identification number, and so on. In an additional example, potentially sensitive information includes contact information such as home address, telephone number, and email address.

Financial information is also potentially sensitive, examples of which include health insurance details, medical records, prescription information, disability status, biometric data, fingerprints, facial recognition data, DNA profiles, and voiceprints. Examples of digital identity information as being potentially sensitive include usernames and passwords, IP addresses, browser cookies, online search history, browsing history, criminal records, and so forth. Legal information is also potentially sensitive, such as information regarding lawsuits and legal disputes, marriage and divorce records, and adoption records. Examples of other demographic information that, if disclosed, could lead to discrimination as potentially sensitive include race or ethnicity, religious or philosophical beliefs, political affiliations, gender identity, sexual orientation, and so forth. Other examples are also contemplated as this list is not exhaustive but merely provides a few examples.

In an implementation, the attribute input module 302 is configured to access application programming interfaces (APIs), via which, data is obtained that specify how particular entities mandate control of the potentially sensitive information. The APIs, for instance, may be utilized to access data describing data protection laws from the European Union, General Data Protection Regulation (GDPR), and so forth. The testing user interface 306 then outputs options to select particular attributes parsed from the accessed data to then serve as a basis to form a policy as further described below.

A machine-learning model 308 may be leveraged by the attribute input module 302 as part of generating the attributes 304. The machine-learning model 308, for instance, may incorporate natural language understanding techniques and generative artificial intelligence (AI) techniques to "expand" upon an input attribute to derive corresponding attributes, which may also be positively or negatively related to the input attribute.

Once input, the attributes 304 as passed from the attribute input module 302 to a policy generation module 310 to form policies 312 specifying "how" use of the attributes is to be controlled. Policies 312, for instance, may indicate that use of a specified attribute is completely restricted. In other instances, the policies 312 indicate permitted use of a specified attribute in one scenario but not another, e.g., as part of a medical treatment scenario but not in a marketing scenario. The policy generation module 310 may also employ a machine-learning model 314 to assist in generation of the policies 312 (e.g., automatically or as a "starting point") using natural language understanding and/or generative AI techniques.

A governance data generation module 316 is then employed to generate the governance data 202 from the attributes 304 and the policies 312, which is illustrated as stored in a storage device 318. The governance data generation module 316, for instance, is configured to format the attributes 304 and the policies 312, e.g., using a machine-learning model 320 as part of generative AI. The formatting is performed so as to be compatible for use in controlling online test design by the design governance module 210, operation during runtime by the runtime governance module 212, and/or use of analyzing and reporting test results by the reporting governance module 214. Additionally, the governance data 202 is usable as a single unified source of controlling how attributes are to be governed through various stages of online testing as a "set one and reuse" implementation, thereby conserving computational and memory storage resources.

Figure 4:
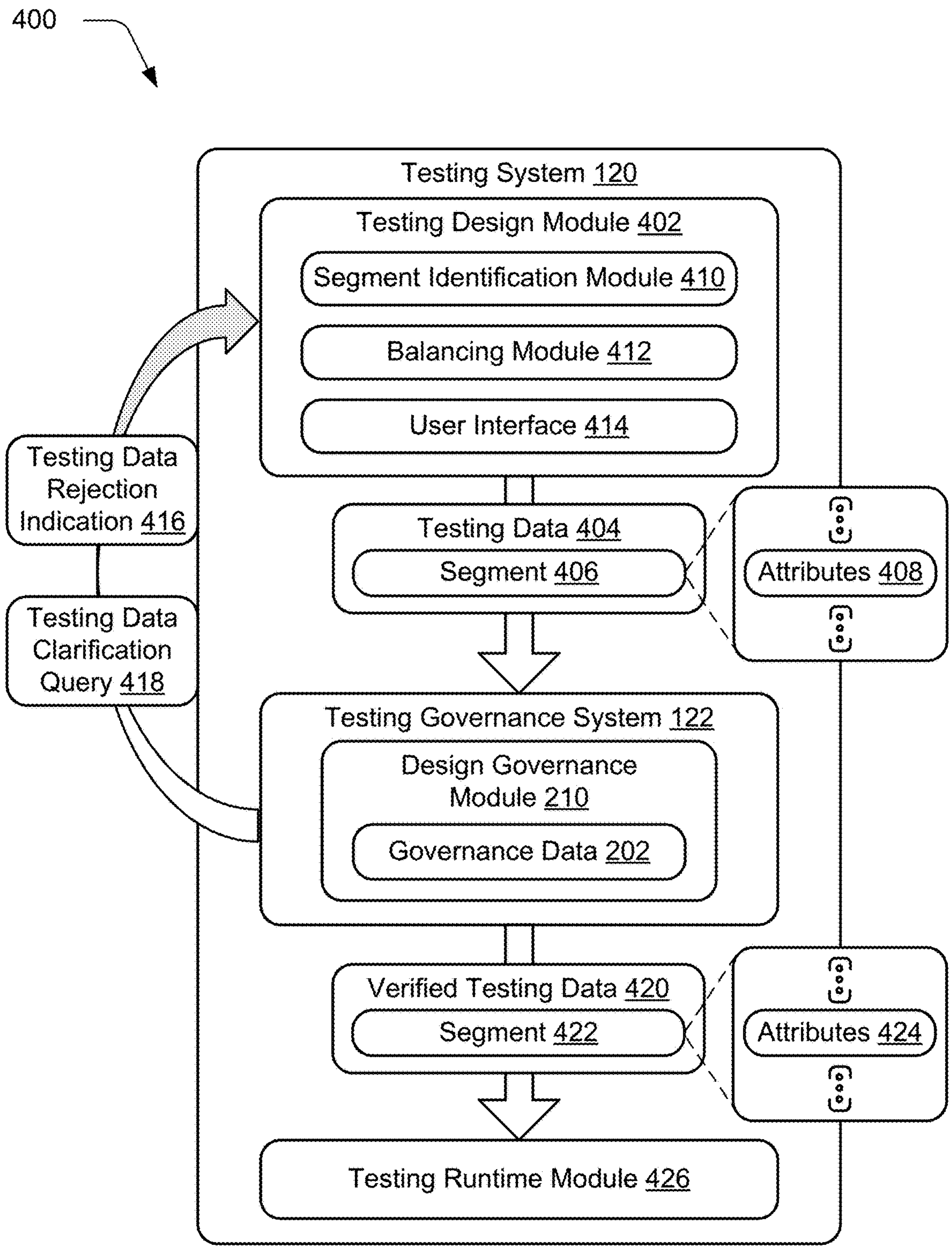
FIG. 4 depicts a system in an example implementation showing operation of a design governance module of FIG. 2 in greater detail.

FIG. 4 depicts a system 400 in an example implementation showing operation of design governance module 210 of FIG. 2 in greater detail. A testing design module 402 is utilized in this example to design testing data 404 defining an online test. In the illustrated example, the testing data 404 identifies a segment 406 using attributes 408 to control membership within the segment. As part of designing the online test, the testing design module 402 includes a segment identification module 410 to identify the attributes 408 of the segment 406 and a balancing module 412 to receive inputs via a user interface 414.

The segment identification module 410 is configured to specify the attributes 408 that define membership of an entity in the segment 406 that is a subject of the online test. In a typical online testing scenario, for instance, a subset of a user population is specified for the user segment through use of the attributes of users to be classified as part of the user segment. The attributes, for instance, are specified as part of a user profile of the service provider system 102 involving interaction with digital services 110.

The balancing module 412 is configured to employ proactive balancing techniques as part of treatment assignments of the online test. Proactive balancing of treatment assignments refers to an online testing capability in which attributes 408 are specified across different treatment groups. For example, in a proactive balancing scenario in which an A/B test is to be executed for two different geographic locations, unbalanced groups and bias may be encountered in the user segments. Proactive balancing addresses these technical challenges by partitioning the users to ensure balanced groups for specified attributes 408.

The testing governance system 122 then employs a design governance module 210 as part of verifying online test generation. To do so, the design governance module 210 utilizes governance data 202 that is generated as described in relation to FIG. 3 to control use of attributes 408 as part of the testing data 404.

The design governance module 210, for instance, is configurable to generate a testing data rejection indication 416 for use of attributes 408 that are not permitted, e.g., in any scenario. In another instance, the design governance module 210 generates a testing data clarification query 418 to obtain additional information as specified by policies 312 included in the governance data 202, e.g., to determine if a particular use of a potentially questionable attribute 408 is permitted.

Continuing with the above examples, in a segment identification scenario the design governance module 210 is configured to restrict use of potentially sensitive attributes. Likewise, in a proactive balancing scenario, use of potentially sensitive attributes is restricted from use in balancing treatments to particular user segments. A variety of other examples are also contemplated.

Once vetted, the design governance module 210 of the testing governance system 122 outputs verified testing data 420 specifying segments 422 and attributes 424 for execution by the testing runtime module 426. In this way, the testing governance system 122 provides data governance protection during a design phase of an online test.

Figure 5:
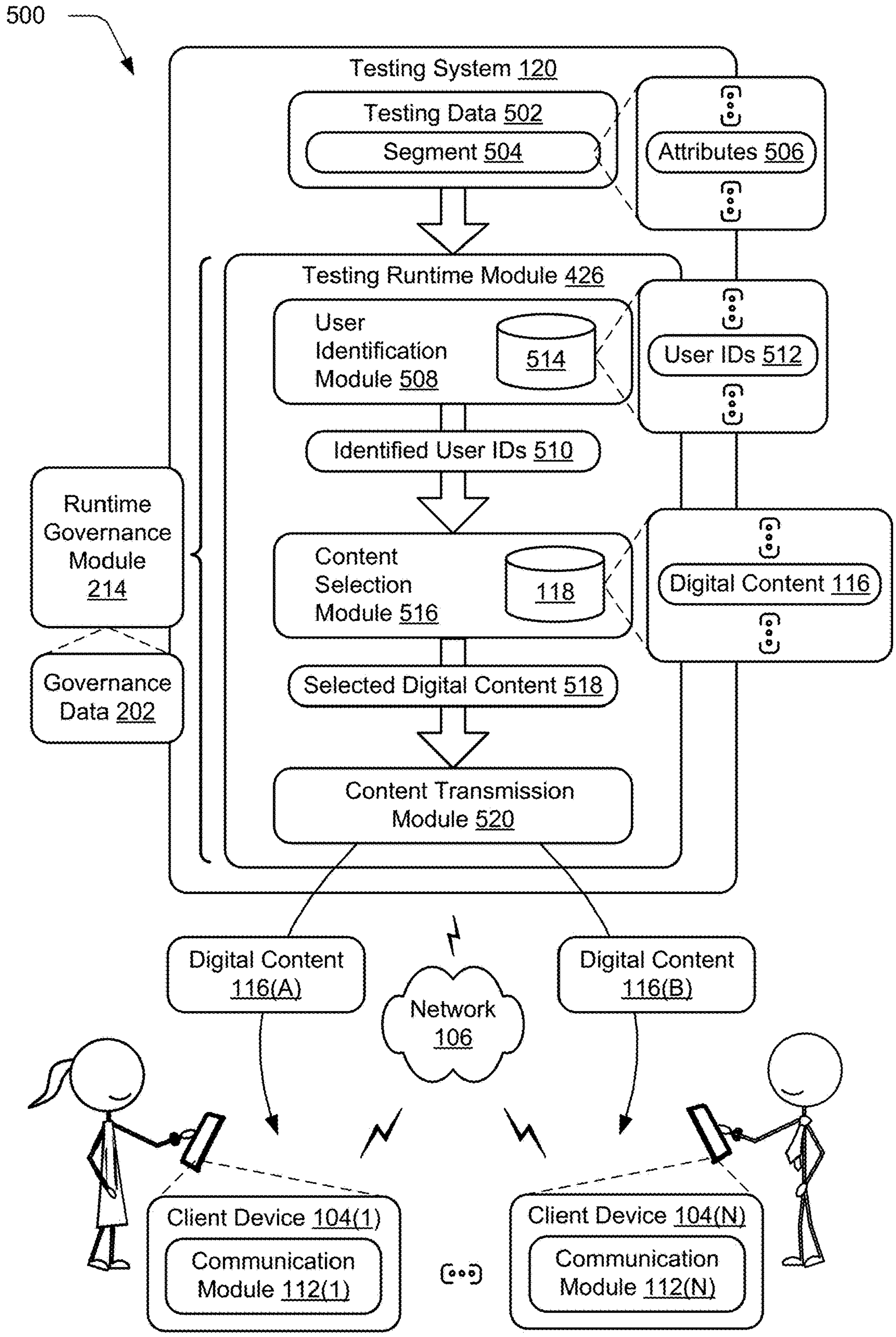
FIG. 5 depicts a system in an example implementation showing operation of a runtime governance module of FIG. 2 in greater detail.

FIG. 5 depicts a system 500 in an example implementation showing operation of a runtime governance module 212 of FIG. 2 in greater detail. The testing runtime module 426 receives testing data 502 having at least one segment 504 defined via respective attributes 506. The testing data 502, for instance, may be the same as the testing data 404 output by the testing design module 402, verified testing data 420 output by the design governance module 210, and so forth. Thus, the testing runtime module 426 is operable independently of or in conjunction with the design governance module 210.

The testing runtime module 426, for instance, employs a user identification module 508 to generate identified user IDs 510 from user IDs 512 maintained in a storage device 514 based on attributes 506 defined by the testing data 502. As part of this, the reporting governance module 214 utilizes the governance data 202 to ensure that permitted attributes are used in the identification, e.g., through restriction and/or additional queries as described above.

The content selection module 516 is configured to generate selected digital content 518 from digital content 116 stored in the storage device 118. The selected digital content 518, for instance, is specified for use in A/B testing by the testing data 502. The reporting governance module 214 in this example is used to ensure that use the selected digital content 518 complies with the governance data 202.

The attributes 304 and policies 312 defined in the governance data 202, for instance, are also usable to control output of the digital content itself based on whether the digital content includes those attributes 304 and policies 312 defining the use of the attributes 304. A content transmission module 520 is then employed to transmit the selected digital content 518 to client devices 104(1)-104(N) associated with the identified user IDs 510 over the network 106 as part of executing of online test specified by the testing data 502.

Figure 6:
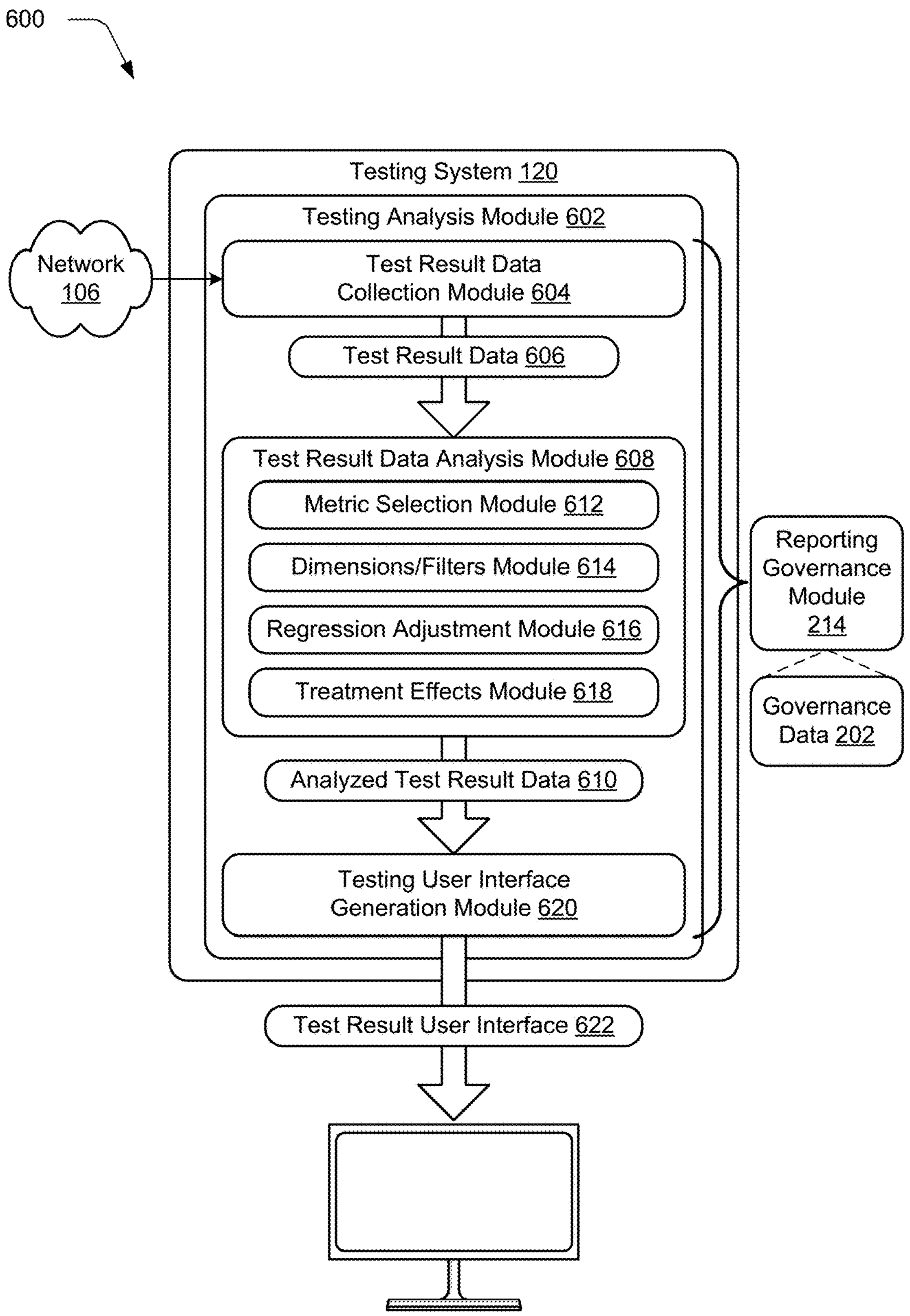
FIG. 6 depicts a system in an example implementation showing operation of a reporting governance module of FIG. 2 in greater detail.

FIG. 6 depicts a system 600 in an example implementation showing operation of a reporting governance module 214 of FIG. 2 in greater detail. A testing analysis module 602 is utilized in this example to report, analyze, and output results of an online test. The reporting governance module 214 is operable independently of or in conjunction with the design governance module 210 and/or the runtime governance module 212.

To begin in this example, a test result data collection module 604 collects test result data 606 describing operation of the online test of FIG. 5. The test result data 606, for instance, is obtained from the service provider system 102 describing monitored user interaction of the client devices 104(1)-104(N) with the digital services 110. In another example, the digital content 116(A)-116(B) includes functionality to "report back" to the test result data collection module 604 of the testing system 120, directly or indirectly. The digital content 116(A)-116(B), for instance, is configurable to include a "smart pixel" to generate and communicate data describing monitored user interaction, such as selection of a link, dwell time, and so forth.

The test result data 606 is then passed as an input to a test result data analysis module 608 to generate analyzed test result data 610. Functionality usable to analyze the test result data 606 includes a metric selection module 612 usable to select metrics for use in the analysis, a dimensions/filters module 614 to apply data filters, a regression adjustment module 616 to implement regression analysis, and a treatment effects module 618 to analyze treatment effects.

As part of this, the reporting governance module 214 employs governance data 202 that is configurable to control "how" the analyzed test result data 610 is generated as well as "what" is included in the analyzed test result data 610. The reporting governance module 214, for instance, is usable to ensure that potentially sensitive attributes are not used in creation of custom metrics and filters for analyzing the test result data 606.

When running experiments using the test result data 606, for instance, it is common to "slice and dice" the results through use of different attributes, each involving potentially different filters and metrics through use of the metric selection module 612 and the filters module 614. In a similar example, the reporting governance module 214 is configured such that the analyzed test result data 610 does not produce a result the violates the governance data 202.

In another instance, potentially sensitive attributes are restricted by the reporting governance module 214 based on the governance data 202 for use in regression adjustments and treatment effects. The regression adjustment module 616, for instance, may employ linear regression modules or robust machine-learning models for a variety of attributes. The reporting governance module 214, therefore, is tasked with governing use of potentially sensitive attributes as part of this analysis.

For the treatment effects module 618, the reporting governance module 214 is configured to control use of potentially sensitive attributes as part of an automated heterogenous treatment effect detection. For example, while a headline report of a test may involve examining an overall difference in performance of a key metric between treatment and control groups (e.g., an average treatment effect), additional analysis is also performed for heterogenous treatment effects. In one such example, "Is a treatment effect for use of a first type of client device different than for use of a second type of client device." Thus, in this example the reporting governance module 214 is configured to implement heterogenous treatment effect detection that controls use of attributes from underlying data, e.g., to restrict, to permit in certain situations based on context, and so forth.

The analyzed test results data 610, once vetted by the reporting governance module 214, is then output to a testing user interface generation module 620 for output in a test result user interface 622. In this way, the testing governance system 122 is configured to overcome technical challenges involved in online testing, which is not possible in conventional techniques. Additionally, these techniques are configured to address technical challenges specific to online testing involving design of the online test, runtime, and reporting which again is not possible in conventional techniques.

Example System and Device

Figure 8:
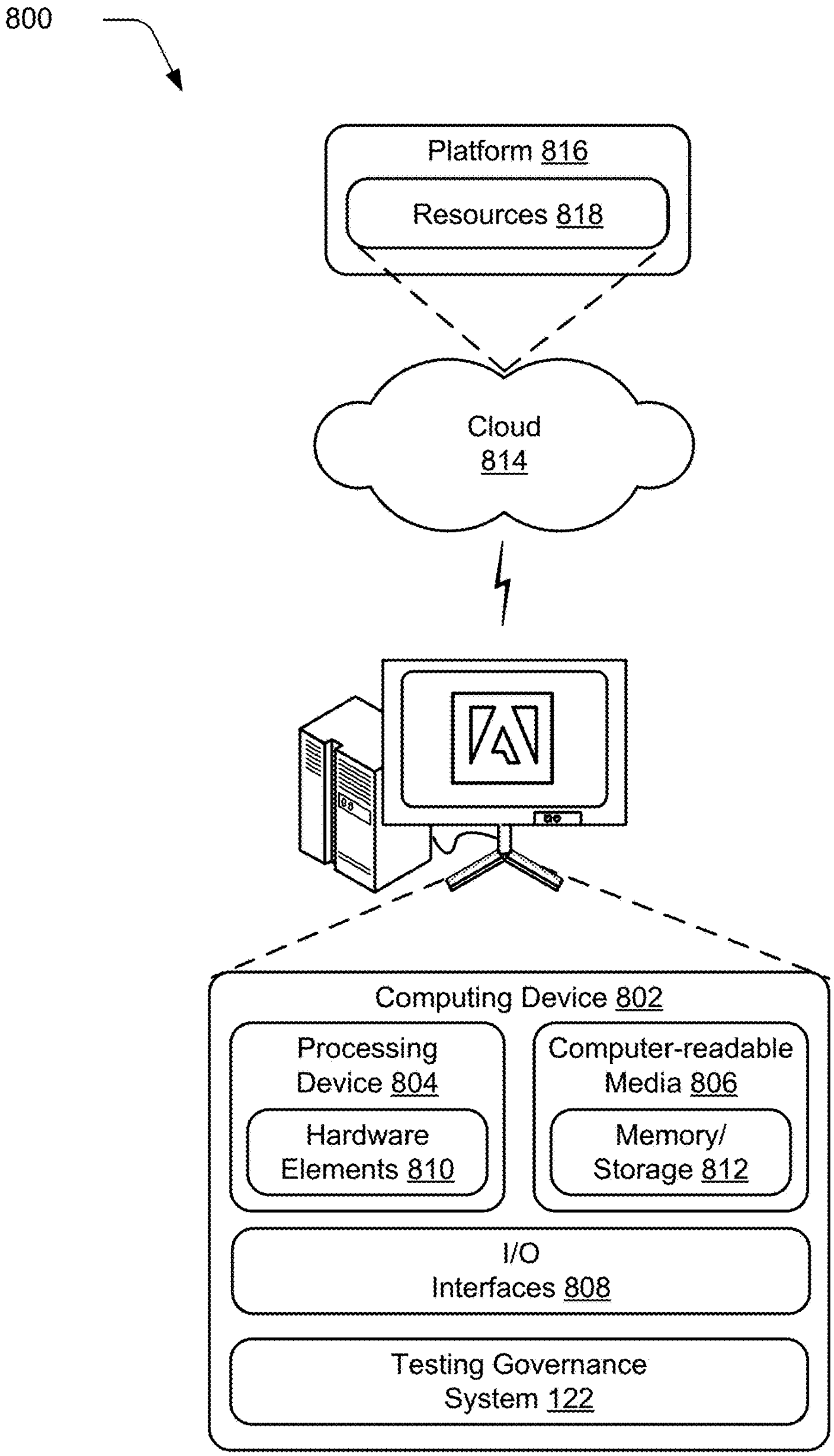
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that implement the various techniques described herein. This is illustrated through inclusion of the testing governance system 122. The computing device 802 is configurable, for example, as a server of a service provider, a device associated with a client (e.g., a client device), an on-chip system, and/or any other suitable computing device or computing system.

The example computing device 802 as illustrated includes a processing device 804, one or more computer-readable media 806, and one or more I/O interface 808 that are communicatively coupled, one to another. Although not shown, the computing device 802 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 804 is representative of functionality to perform one or more operations using hardware. Accordingly, the processing device 804 is illustrated as including hardware element 810 that is configurable as processors, functional blocks, and so forth. This includes implementation in hardware as an application specific integrated circuit or other logic device formed using one or more semiconductors. The hardware elements 810 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 806 is illustrated as including memory/storage 812 that stores instructions that are executable to cause the processing device 804 to perform operations. The memory/storage 812 represents memory/storage capacity associated with one or more computer-readable media. The memory/storage 812 includes volatile media (such as random access memory (RAM)) and/or nonvolatile media (such as read only memory (ROM), Flash memory, optical disks, magnetic disks, and so forth). The memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 802. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 810. The computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing device 804. The instructions and/or functions are executable/operable by one or more articles of manufacture (for example, one or more computing devices 802 and/or processing devices 804) to implement techniques, modules, and examples described herein.

The techniques described herein are supported by various configurations of the computing device 802 and are not limited to the specific examples of the techniques described herein. This functionality is also implementable all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 include applications and/or data that can be utilized while computer processing is executed on servers that are remote from the computing device 802. Resources 818 can also include services provided over the Internet and/or through a subscriber network, such as a cellular or Wi-Fi network.

The platform 816 abstracts resources and functions to connect the computing device 802 with other computing devices. The platform 816 also serves to abstract scaling of resources to provide a corresponding level of scale to encountered demand for the resources 818 that are implemented via the platform 816. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

In implementations, the platform 816 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:

a governance data input module implemented by a processing device to receive governance data defining how access to data that is identified as potentially sensitive is to be controlled;

a testing data input module implemented by the processing device to receive testing data defining an online test of digital content to be transmitted to a plurality of client devices via a network, the online test involving monitored user interaction of the plurality of client devices with the digital content; and a testing governance system implemented by the processing device to control performance of the online test during design, runtime, and reporting stages of the online test in transmitting the digital content over the network to the plurality of client devices based on the governance data as controlling how access to data that is identified as potentially sensitive is to be controlled as part of the transmitting the digital content to the plurality of client devices and as part of the monitored user interaction of the plurality of client devices with the digital content, the testing governance system controlling the design stage based on the governance data employing attributes and policies to control which attributes are included as part of designing the online test and use of the attributes as part of the online test, controlling the runtime stage including control of user selection of attributes and control of digital content transmission to the plurality of client devices based on the governance data, and controlling the reporting stage of test result data of the online test based on the governance data describing control of how and what data is reported as part of the test result data.

2. The system as described in claim 1, wherein the governance data identifies the attributes that are potentially sensitive and the policies to be applied for the attributes.

3. The system as described in claim 1, wherein the testing governance system includes a design governance module configured to control design of the testing data of the online test.

4. The system as described in claim 3, wherein the design governance module is configured to control the design by restricting inclusion of one or more of the attributes usable to define a segment of a user population.

5. The system as described in claim 1, wherein the testing governance system includes a runtime governance module configured to control operation of the testing data at runtime.

6. The system as described in claim 5, wherein the runtime governance module is configured to control operation of the testing data at runtime by restricting use of one or more of the attributes usable to define a segment of a user population as part of the online test.

7. The system as described in claim 1, wherein the testing governance system includes a reporting governance module configured to control reporting of analysis of the test result data resulting from the performance of the online test.

8. The system as described in claim 7, wherein the reporting governance module is configured to control reporting by restricting use of one or more of the attributes usable to define a segment of a user population as part of reporting results of the online test.

9. The system as described in claim 1, wherein the online test is configured as an A/B test involving a defined segment of a user population.

10. A computing device comprising:

a processing device; and a computer-readable storage medium having instructions stored thereon that, responsive to execution by the processing device, causes the processing device to perform operations including:

receiving inputs defining an online test of digital content to be transmitted to a plurality of client devices via a network, the online test involving monitored user interaction of the plurality of client devices with the digital content;

controlling design of the online test based on governance data defining how access to user data that is identified as potentially sensitive is to be controlled for access as part of the monitored user interaction, the governance data employing attributes and policies to control which attributes are included as part of designing the online test and use of the attributes as part of the online test;

controlling performance of the online test based on the governance data in transmission of the digital content over a network to the plurality of client devices using the controlled design to control access to the user data that is identified as potentially sensitive by the plurality of client devices as part of the online test including control of user selection of attributes and control of digital content transmission based on the governance data; and controlling reporting of test result data of the online test based on the governance data, the governance data describing control of how and what data is reported as part of the test result data.

11. The computing device as described in claim 10, wherein the governance data identifies one or more attributes that are potentially sensitive and are configured to define membership, as part of the online testing, in a user segment of a user population.

12. The computing device as described in claim 11, wherein the user segment is a demographic segment, psychographic segment, needs-based segment, technographic segment, or a customer-journey segment.

13. The computing device as described in claim 11, wherein the one or more attributes define personal identification information (PII), contact information, health information, digital identity information, or sensitive demographic information.

14. The computing device as described in claim 10, wherein the controlling includes controlling operation of the testing data at runtime.

15. The computing device as described in claim 10, wherein the controlling further includes controlling reporting of analysis of the test result data resulting from the performance of the online test.

16. A method comprising:

receiving inputs defining an online test of digital content to be transmitted to a plurality of client devices via a network, the online test involving monitored user interaction of the plurality of client devices with the digital content;

controlling design of the online test based on governance data defining how access to user data that is identified as potentially sensitive is to be controlled for access as part of the monitored user interaction, the governance data employing attributes and policies to control which attributes are included as part of designing the online test and use of the attributes as part of the online test;

controlling performance of the online test based on the governance data in transmission of the digital content over a network to the plurality of client devices using the controlled design to control access to the user data that is identified as potentially sensitive by the plurality of client devices as part of the online test including control of user selection of attributes and control of digital content transmission based on the governance data; and controlling reporting of test result data of the online test based on the governance data, the governance data describing control of how and what data is reported as part of the test result data.

17. The method as described in claim 16, wherein the governance data identifies one or more attributes that are potentially sensitive and are configured to define membership, as part of the online testing, in a user segment of a user population.

18. The method as described in claim 17, wherein the user segment is a demographic segment, psychographic segment, needs-based segment, technographic segment, or a customer-journey segment.

19. The method as described in claim 17, wherein the one or more attributes define personal identification information (PII), contact information, health information, digital identity information, or sensitive demographic information.

20. The method as described in claim 16, wherein the controlling includes controlling operation of the testing data at runtime.

* * * * *